United States Patent [19]

Yamazaki et al.

[11] Patent Number: 4,601,105
[45] Date of Patent: Jul. 22, 1986

[54] VEHICLE MEASURING INSTRUMENT

[76] Inventors: Kichisaburo Yamazaki; Katsunori Yamazaki; Yoshihiro Yamazaki, all of 3-36, Shinkoyasu 2-chome, Kanagawa-ku Yokohama-shi Kanagawa 221, Japan

[21] Appl. No.: 675,839
[22] PCT Filed: Mar. 24, 1984
[86] PCT No.: PCT/JP84/00132
§ 371 Date: Nov. 13, 1984
§ 102(e) Date: Nov. 13, 1984
[87] PCT Pub. No.: WO84/03938
PCT Pub. Date: Oct. 11, 1984

[30] Foreign Application Priority Data

Apr. 5, 1983 [JP] Japan ............................ 58-58735
Oct. 18, 1983 [JP] Japan ............................ 58-194735

[51] Int. Cl.⁴ ........................... G01B 5/25; G01B 5/14
[52] U.S. Cl. ............................... 33/180 AT; 33/288
[58] Field of Search ............ 33/180 AT, 181 AT, 288

[56] References Cited

U.S. PATENT DOCUMENTS

Re. 31,000  7/1982  LeGrand et al. ............. 33/180 AT
3,611,575  10/1971  Chartier ............................... 33/46
3,869,804   3/1975  Friend ................................. 33/288
4,242,803   6/1981  Dory .................................. 33/288
4,329,784   5/1982  Bjork ................................ 33/180
4,442,608   4/1984  Clausen ........................ 33/180 AT

FOREIGN PATENT DOCUMENTS 2396952  2/1979  France ............................. 33/288
 113501  9/1978  Japan .

Primary Examiner—Richard R. Stearns
Attorney, Agent, or Firm—Albert L. Jeffers; Stephen T. Belsheim

[57] ABSTRACT

A vehicle measuring instrument to measure a position-deviation of any selected vehicle reference point as when a person such as a car mechanic performs repair and maintenance of a car. With the well known vehicle measuring instrument of such type, an error caused by a deviation of the perpendicularity indicated by a pendulum member from the vertical direction of the vehicle due to an inclination of this vehicle has been detected and then a troublesome sequence of operations have been performed to compensate such error. According to the present invention, there is provided an angle variable portion by which an angle of each suspender with respect to a base frame can vary under an effect of this base frame's own weight in response to an inclination of the vehicle so that a reference portion is automatically displaced so as to respond to the deviation of the pendulum member and thereby to compensate said error automatically.

24 Claims, 14 Drawing Figures

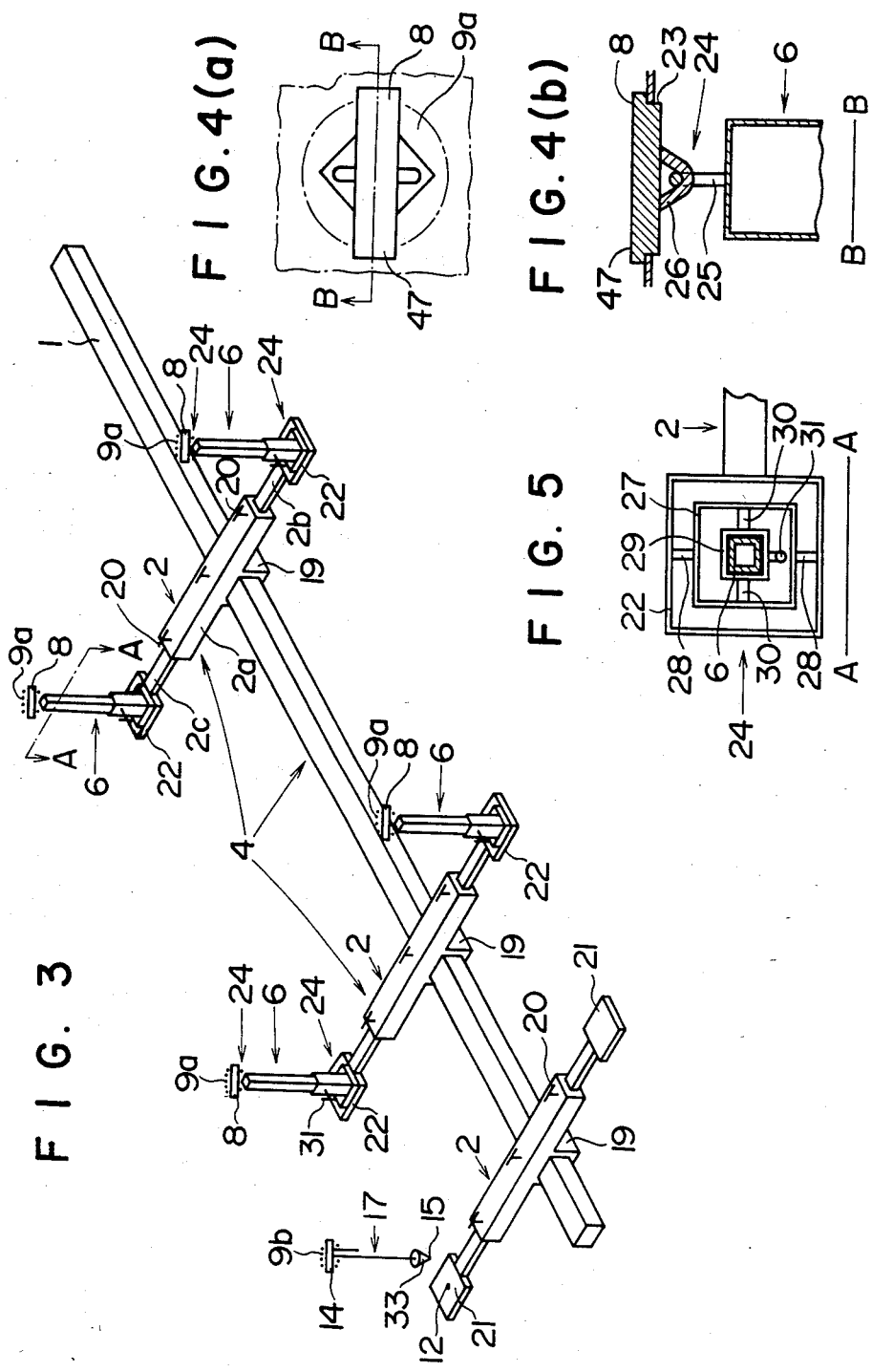

VEHICLE MEASURING INSTRUMENT

FIELD OF THE ART

The present invention relates to a vehicle measuring instrument used to determine possible deviation of some selected vehicle reference points from respective normal positions. For example, in repair and maintenance of the vehicle by persons such as car mechanics and, more particularly, in a vehicle measuring instrument including a base frame at least longitudinally and transversely extending, three or more suspenders having connectors adapted to be connected to a vehicle at vehicle reference points (the expression "vehicle reference points" used in the present specification and the annexed claims shall not be limited to so-called car body reference points but shall include all locations useful as reference points for the measuring of a vehicle.), said suspenders at least vertically extending and connected to the base frame at three or more positions not lying in a straight line and thereby suspending the base frame from the vehicle, reference portions provided on said base frame, pendulum members serving to indicate perpendicularity under an effect of its own gravity, and said pendulum members having reference point corresponding portions to be positioned in conformity with the respective vehicle reference points and opposing portions to be opposed to said reference portions so that the possible deviations of the vehicle reference points from the respective normal positions may be indicated with the above-mentioned arrangement (the vehicle measuring instrument of such arrangement will be referred to hereinafter as "the vehicle measuring instrument of this type"), characterized in that there are provided angle variable portions permitting angles of the respective suspenders with respect to the base frame to vary in longitudial, transverse and composite directions under an effect of the base frame's own weight depending on an inclination of the vehicle.

BACKGROUND OF THE INVENTION (a) A well known embodiment of the vehicle measuring instrument of this type as shown in FIG. 1.

There are provided a pair of longitudinally extending frames 1 across which a necessary number of transverse frames 2 extend. Each of the transverse frames 2 is provided on its lower side adjacent opposite ends with sliders 3, one for each end, by which this transverse frame 2 is slidably movable along the longitudinal frames 1. The longitudinal frames 1 and the transverse frames 2 respectively have measuring scales (not shown) and constitute together a base frame 4. Each of the longitudinal frames 1 carries on its upper side a pair of suspenders 6 each provided at its lower end with a slider 5 by which the associated suspender 6 is slidably movable along the associated longitudinal frame 1. Said suspenders 6 vertically extend and are held perpendicularly to the respective longitudinal frames 1. There are provided two holding rods 7 adapted to connect the respective lateral pairs of the suspenders 6 at their upper ends and each of such holding rods 7 is provided with a pair of connectors 8 being laterally slidable along holding rod 7 and mounted via holding rods 7 on associated suspenders 6. The connectors 8 are adapted to be connected to respective vehicle reference points 9a and the base frame 4 is suspended by the suspenders 6 from the vehicle 10.

One or two slider(s) 11 is or are slidably movable along each of the transverse frames 2 and has or have centrally on top surface(s) upwardly pointed pin(s) 13 having its or their upper end(s) defining reference portion(s) 12.

There are provided pendulum members 17 vertically extending and having upper ends as reference point corresponding portions 14 adapted to be connected to vehicle reference points 9b, and 9c, respectively, and lower ends defining pins 16 of which downwardly pointed ends 15 destined to be opposed to the associated reference portions 12. Each of the pendulum members 17 comprises a transparent pipe having a larger diameter and a measuring scale thereon and another pipe having a smaller diameter telescopically assembled so as to be extendible and contractible, and is vertically suspended from the vehicle reference point 9b or 9c under an effect of its own gravity, indicating a perpendicularity.

In such manner, possible deviations of the selected vehicle reference points 9b from their normal positions may be indicated (such arrangement is described in the specification of U.S. Pat. No. 4,329,784.).

(b) A well known manner in which the vehicle measuring instrument of this type has conventionally been used (see FIG. 1).

This has usually been accomplished by a sequence of operations (1) through (4) as follows:

(1) Operation of positioning the base frame and the arrangement associated with the vehicle reference points to be measured Suitable two pairs of vehicle reference points 9a (i.e., four points) precisely lying in a laterally symmetric relationship are selected from the undersides of the right and left door sills of the vehicle 10, then a single vehicle reference point 9b to be determined of a position deviation is selected from the vehicle 10, the normal dimensional relationship of these vehicle reference points 9a and 9b not only in longitudinal but also in transverse directions is determined in reference with the plan view showing the vehicle dimensional schema, then four connectors 8 and one reference portion 12 are positioned on the base frame 4 according to the arrangement defined by said normal dimensional relationship. Now, the normal vertical dimensions of these vehicle reference points 9a and 9b with respect to the vehicle reference plane are respectively determined from the side view showing the vehicle dimensional schema, lengths of four suspenders 6 are adjusted to the vertical dimensions of said normally positioned four vehicle reference points 9a, respectively, and the length of the pendulum member 17 is adjusted to the vertical dimension of said single vehicle refernce point 9b to be measured. Then, the connectors 8 of the four respective suspenders 6 and the reference point corresponding portion 14 of said single pendulum member 17 are connected to the corresponding reference points 9a and 9b so as to suspend the base frame 4 and the single pendulum member 17 from the vehicle 10.

(2) Operation of detecting an error due to inclination of the vehicle

A necessary number (usually in order of four) of normally positioned vehicle reference points 9c are selected from the vehicle 10 and the correspondingly necessary number (usually in order of two) transverse frames 2 are provided across the longitudinal frames 1. The dimensional relationship of these normally positioned vehicle refernce points 9c not only in longitudinal but also in transverse directions is determined in reference with the plan view showing the vehicle dimensional schema to position four reference portions 12, two for each of these two transverse frames 2 in conformity with the respective vehicle reference points 9c. On the other hand, there are provided the same number of the pendulum members 17 as the number of these normally positioned vehicle reference points 9c and vertical dimensions of the respective vehicle reference points 9c with respect to the vehicle reference plane are determined in reference with the side view showing the vehicle dimensional schema so that lengths of the respective pendulum members 17 are adjusted to the vertical dimensions of the respective vehicle reference points 9c and said pendulum members 17 are suspended from the associated vehicle reference points 9c (with the vehicle measuring instrument of this type, it is preferred to select the vehicle reference points 9a, 9b, 9c lying in similar levels, if necessary, when these vehicle reference points 9a, 9b, 9c are selected, or to make the respective reference portions 12 level-adjustable on the base frame 4 so that the suspenders 6 and the pendulum members 17 may be adjusted to similar lengths, if necessary.). Even a slight inclination of the vehicle 10 during this adjustment (such an inclination of the vehicle 10 is almost inevitable, as will be described later) causes a perpendicularity indicated by each pendulum member 17 to deviate from the vertical direction of the vehicle 10. Thus, the opposing portions 15 of the respective pendulum members 17 suspended from the normally positioned vehicle reference points 9c deviate from the positions of the corresponding reference portions 12 in longitudinal, transverse or composite direction. Such deviations may be determined to detect the error due to the inclination of the vehicle 10.

It should be noted here that, if the vehicle 10 is accurately horizontal during this adjustment (such a situation is not absolutely impossible but rare), said opposing portions 15 will be in alignment with the corresponding reference portions 12 so that the operation 2 can be followed directly by the Operation of Measurement 4 as will be described in detail. However, the operation 2 is usually followed by an operation 3.

(3) Operation of compensating an error due to inclination of the vehicle

The operation of finely adjusting positions of the reference portions 12 in longitudinal direction by manually displacing the longitudinal frames 1 from a state in which said longitudinal frames are freely slidable with respect to the sliders 5 of the suspenders 6 and the operation of finely adjusting positions of the reference portions 12 in transverse direction by manually displacing the holding rods 7 from a state in which said holding rods 7 are freely slidable with respect to the connectors 8 are repeated with caution to maintain a correct relative position of said reference portions 12 so that the respective reference portions 12 are positioned precisely in alignment with the opposing portions 15 of the corresponding pendulum members 17 suspended from said normally positioned vehicle reference points 9c.

(4) Operation of measurement

Amount and direction by and in which the opposing portion 15 of the pendulum member 17 suspended from said vehicle reference point 9b to be measured deviates from the corresponding reference portion 12 may be determined by measuring amount and direction by and in which said vehicle reference point 9c deviates from its normal position.

It should be noted here that the above-mentioned sequence of operations (1) through (4) is not always performed exactly in this order and sometimes any one of these operations may be interrupted by any other operation.

The vehicle measuring instrument of this type including the components such as the pendulum members and the reference portions constructed in manners other than those as mentioned above is also well known (not shown).

There is provided a transverse frame carrying a laser oscillator adapted to be laterally movable and to generate a laser in a longitudinal direction at the rear-most position on the base frame while there are provided laser oscillators adapted to be longitudinally movable and to generate lasers in transverse direction at the left ends of the respective transverse frames. These laser oscillators define the reference portions. On the other hand, each pendulum member comprises a pipe having on its upper end a reference point corresponding portion adapted to be connected to the corresponding vehicle reference point and on its lower end a transparent plate so that this pendulum member may be perpendicularly suspended, under an effect of its own gravity, from the vehicle reference point. Really, said pipe comprises an outer pipe of a larger diameter and an inner pipe of a smaller diameter being slidable within said outer pipe so that this pipe assembly may be telescopically extendible and contractible. The transparent plate is centrally provided with a spot-like mark serving as the opposing portion.

Further another arrangement is also well known in which the suspenders, each comprising a pipe having on its upper end a connector adapted to be connected to the corresponding vehicle reference point, are mounted on the transverse frames of the base frame perpendicularly to said transverse frames (see the specification of U.S. Pat. No. 3,869,804).

(c) Advantages and disadvantages of the well known vehicle measuring instrument of this type (see FIG. 1.).

It is extremely convenient or advantageous for persons such as the car mechanics that, even when an external force is accidentally applied to the pendulum member 17 during repair and maintenance of a vehicle, pendulum member 17 readily escapes so as to avoid possible damage and, once this external force has been removed, said pendulum member 17 immediately restores its initial position, since each pendulum member 17 is perpendicularly suspended from the vehicle in the well known vehicle measuring instrument of this type.

However, such arrangement of the pendulum members 17 results in that even a slight inclination of the vehicle 10 causes a perpendicularity indicated by each pendulum member 17 to deviate from the vertical direction of the vehicle 10 and a direct measurement leads to an erroneous result. It is for this reason that the operation of detecting an error due to inclination of the vehicle as set forth in said paragraph (2) and the operation of compensating an error due to inclination of the vehicle as set forth in said paragraph (3) are performed. Furthermore, even slight changes in the direction and in the inclination angle of the vehicle 10 occurring before a vehicle measurement has been completed will require a repetition of the operation of compensating an error due to inclination of the vehicle as set forth in said paragraph (3).

Such operation of error compensation cannot be accomplished at one end the car mechanic must walk about here and there around the vehicle 10 and repeat fine adjustment many times until the error will have progressively been compensated. Thus, this has been an extremely troublesome, time-consuming operation.

Additionally, the vehicle intrinsically has a tendency to incline due to uneven flattening of components such as suspensions and tires. Moreover, the floor in the workshop for vehicle repair and maintenance is generally inclined more or less as for improvement of drainage or somewhat irregular, although such floor appears to be horizontal and smooth. Thus, the vehicle 10 placed directly or with interposition of a bench or like on such floor is necessarily inclined. Inclination direction or inclination angle of the vehicle 10 often varies during operation of repair and maintenance due to an enormous force in order of several tons applied to the vehicle 10.

Thus, it has been inevitable that the vehicle 10 to be measured is inclined or the direction or angle of such inclination changes before the measurement has been completed. With the well known vehicle measuring instrument of this type, therefore, for every time that such phenomenon occurs, it has been inconveniently required to repeat the operation of detecting an error due to inclination of the vehicle as set forth in said paragraph (2) and the operation of compensating an error due to inclination of the vehicle as set forth in said paragraph (3).

SUMMARY OF THE INVENTION

A principal object of the present invention is to provide a vehicle measuring instrument of this type adapted for automatic compensation of an error due to a deviation of the perpendicularity indicated by each pendulum member from the vertical direction of the vehicle, which occurs, in turn, due to inclination of the vehicle.

According to the present invention, there are provided angle variable portions in the vehicle measuring instrument of this type, said angle variale portions permitting an angle of each suspender with respect to the base frame to be changed under an effect of said base frame's own weight in longitudinal, transverse and composite directions depending on the inclination of the vehicle so that the reference portions are automatically position-adjusted to compensate deviations of the respective pendulum members and thereby the deviation of the perpendicularity indicated by each pendulum member from the vertical direction of the vehicle due to inclination of the vehicle, i.e., the error in question can be automatically compensated.

The present invention thus permits the error due to inclination of the vehicle to be automatically compensated with the same precision as in the operation of detecting an error due to inclination of the vehicle as set forth in said paragraph (2) and the operation of compensating an error due to inclination of the vehicle as set forth in said paragraph (3), so that the present invention permits the desired vehicle measurement to be started after an extremely short time for preparation and to be completed also in an extremely short time without requirement for said operations (2) and (3).

BRIEF DESCRIPTION OF THE DRAWINGS

FIG. 3 is a perspective view of said embodiment;

FIG. 4a is a plan view showing a suspender used in said embodiment adjacent a connector thereof;

FIG. 4b is a sectional side view taken along a line B—B in FIG. 4a;

FIG. 5 is a plan view taken along a line A—A in FIG. 3;

FIG. 11 is a perspective view of the embodiment shown in FIG. 10 showing the rectangular plate and a suspender which is chord-like or rope-like;

DESCRIPTION OF A PREFFERED EMBODIMENT OF THE INVENTION

Figure 1:
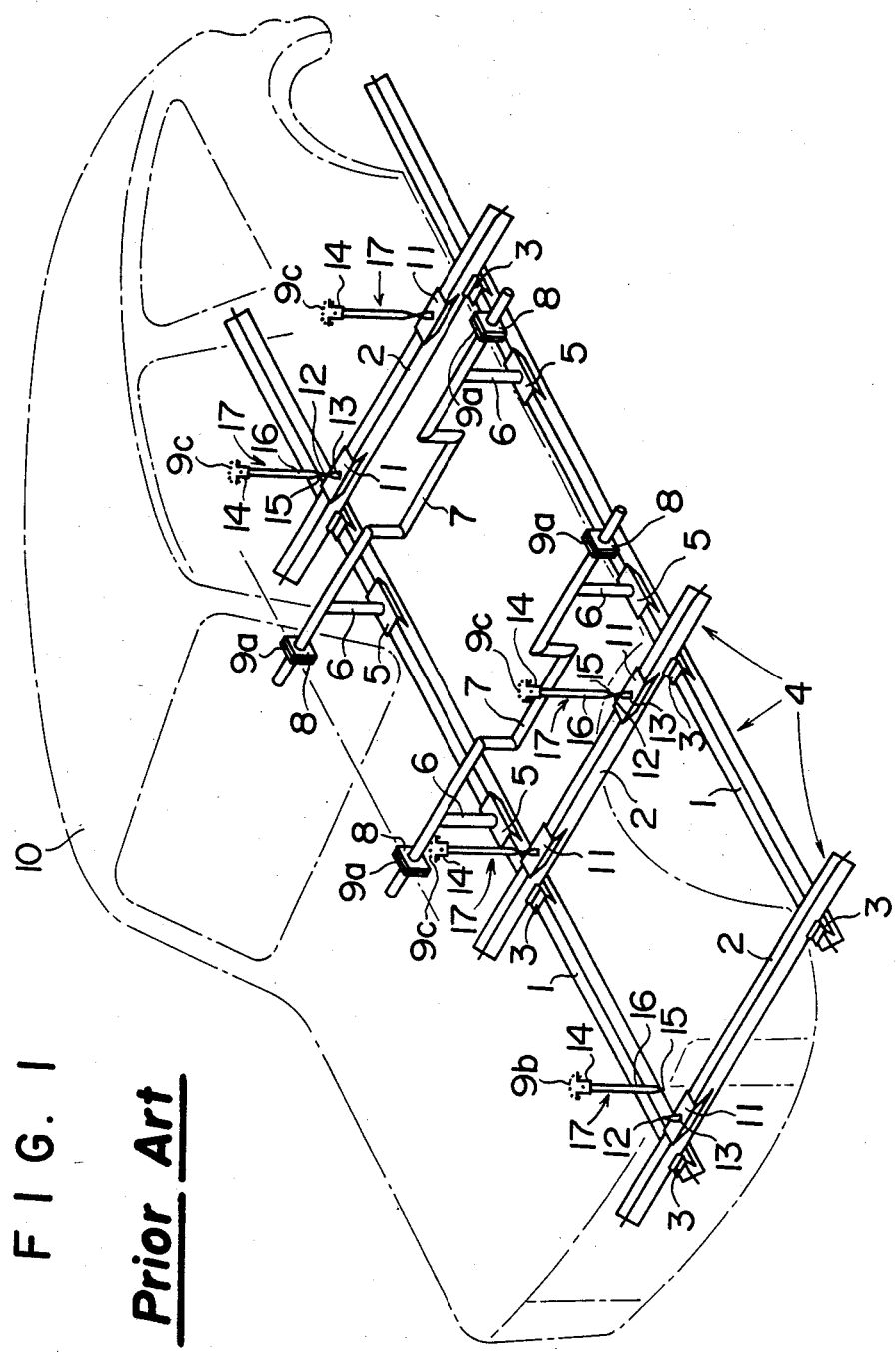
FIG. 1 is a perspective view showing a well known vehicle measuring instrument of this type.

An embodiment of the present invention will now be described (See FIGS. 2 through 6.) It should be understood that, for better understanding of the effect achieved by the present invention, the vehicle 10 is illustrated as noticeably inclined with respect to the line representing a horizontal plane 18 and the vehicle fixing stand as well as the floor is omitted in FIG. 2.

Each longitudinal frame 1 comprises a longitudinally extending square pipe while three transverse frames 2 respectively have box-shaped slidable portions 19 and are slidable along the longitudinal frames 1. Both the longitudinal frames 1 and the transverse frames 2 are provided thereon with measuring scales (not shown) and together constitute a base frame 4. Each transverse frame 2 consists of a middle transverse frame section 2a, a left transverse frame section 2b and a right transverse frame section 2c in such a manner that the left and right transverse frame sections 2b and 2c may be telescopically slidable within the middle transverse frame section 2a and thereby the transverse frame 2 as a whole may be extendible and contractible. Each middle transverse frame section 2a is provided in its upper side adjacent opposite ends with threaded holes into which threaded handles 20 are respectively engaged in order to block the left and right transverse frame sections 2b and 2c against further slidable displacements. The frontmost transverse frame 2 is provided at laterally opposite ends with square plates 21 which are centrally provided, in turn, with spot-like marks serving as reference portions 12. The transverse frames 2 which are second and third from the front, respectively, are provided at laterally opposite ends with square large frames 22, respectively.

Each suspender 6 comprises a vertically extending square pipe which is provided at its upper end with a connector 8 adapted to be connected to associated vehicle reference point 9a and serves to suspend the base frame from the vehicle 10. As seen in FIGS. 4a and 4b, the connector 8 comprises a rectangular plate 47 provided centrally on its underside with a projection 23 adapted to be engaged into an opening of the vehicle reference point 9a.

Figure 2:
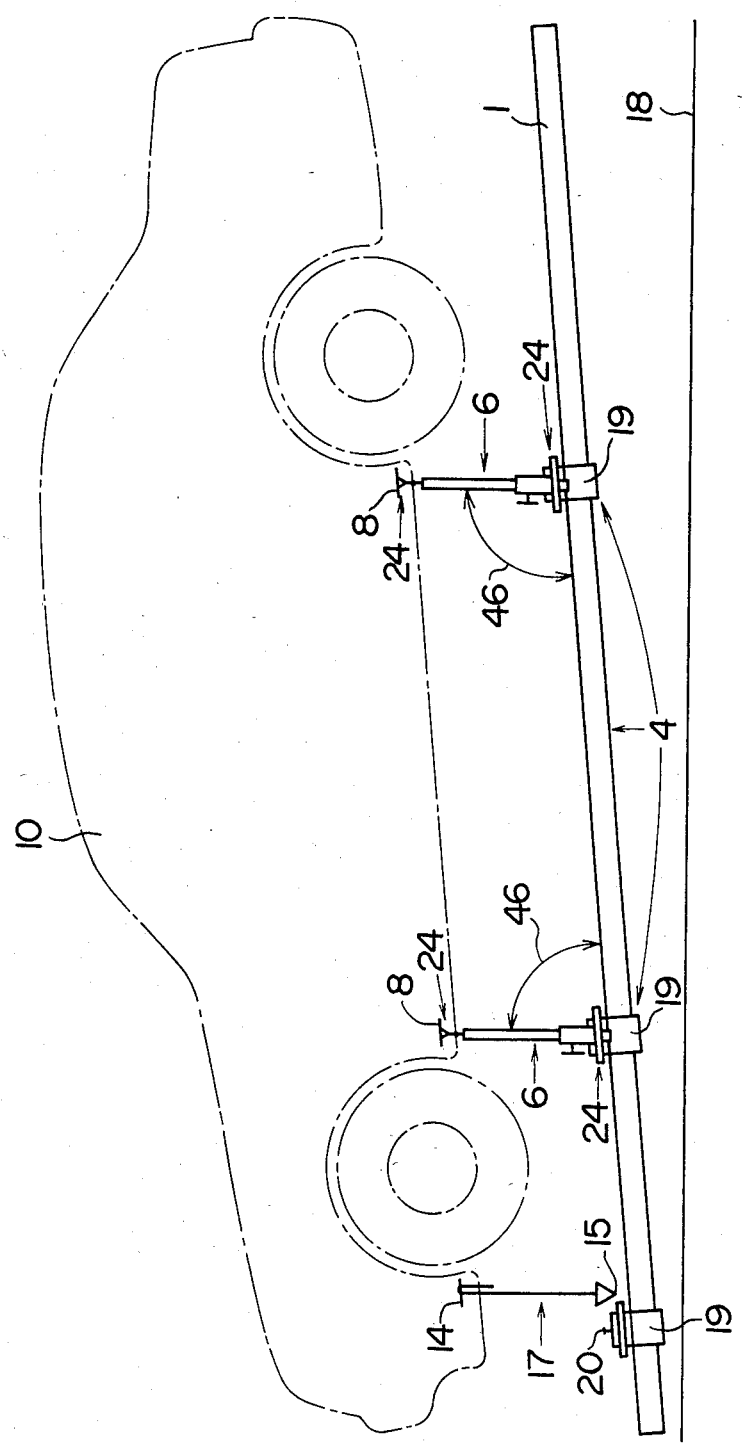
FIG. 2 is a side view showing an embodiment of the present invention as being suspended from the vehicle.

There are provided angle variable portions 24 just below the connectors 8 of the respective suspenders 6 and in the large frames 22 of the respective transverse frames 2 so that these angle variable portions 24 permit angles of the respective suspenders 6 with respect to the base base frame 4 to vary under an effect of said base frame's own weight in longitudinal, transverse and composite directions depending on an inclination of the vehicle 10 (the angle of the suspenders 6 with respect to the base frame 4 in the longitudinal direction is indicated by an arc-shaped double arrow 46 in FIG. 2). The angle variable portion 24 provided just below the connector 8 of each suspender 6 comprises a pair of V-shaped hooks 25 and 26 centrally provided on the upper end of the suspender 6 and on the lower end of the connector 8, respectively, so that these paired hooks are opposed to each other in mutual engagement (See FIG. 4b).

The angle variable portion 24 associated with each transverse frame 2 has an arrangement as follows (See FIG. 5). An inner square frame 27 so dimensioned to be enclosed loosely within the large frame 22 is placed within said large frame 22. Front sides of these large and inner frames 22 and 27 as well as rear sides of these large and inner frames 22 and 27 are respectively connected by a rotatable axis 28 so that the inner frame 27 may swing around said rotatable axis 28 and lateral sides of the frame 27 may be displaced up and down. A square small frame 29 so dimensioned to be enclosed loosely within the inner frame 27 is placed within said inner frame 27. Left sides of these inner frame 27 and small frame 29 as well as right sides of these two frames are respectively connected by a rotatable axis 30 so that the small frame 29 may swing around said rotatable axis 30 and front and rear sides of this frame 29 may be displaced up and down. The suspender 6 extends through the small frame 29 which is provided centrally in its front side with a threaded hole into which a threaded handle 31 is fastened to hold the suspender 6 at a desired length. These angle variable portions 24 serve to interconnect the base frame 4 and the respective suspenders 6.

Figure 6:
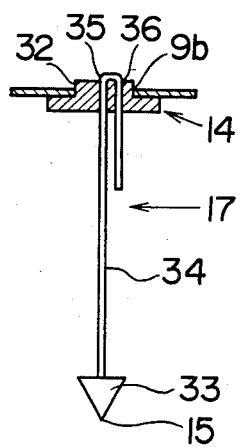
FIG. 6 is a side view showing a pendulum member partially in section.

FIG. 6 shows a single pendulum member 17 comprising a reference point corresponding portion 14 at an upper end, said portion 14 consisting of a magnet in the form of a rectangular plate provided at upper side with a projection 32 adapted to be engaged into the opening of the vehicle reference point 9b to be measured, a conical plumb bob 33 at a lower end, said conical plumb bob 33 having its apex defining the opposing portion 15 to be opposed to the associated reference portion 12, and a flexible slender rope 34 interconnecting said reference point corresponding portion 14 and said conical plumb bob 33. The pendulum member 17 thus arranged perpendicularly hangs down under an effect of its own gravity and thereby indicates a perpendicularity. The reference point corresponding portion 14 is provided at its central and slightly eccentric positions with openings 35 and 36 both vertically extending therethrough and with respective diameters substantially same as that of the rope 34 which is, in turn, inserted upwardly through said opening 35 and then downwardly into said opening 36. Thus, the rope 34 is effectively held on the reference point corresponding portion 14 under a friction between the openings 35 and 36 and the rope 34 and said rope 34 may be displaced with respect to these openings 35 and 36 to adjust a length of the pendulum member 17.

Now the manner in which the measuring instrument of the present invention is used will be described.

(1) Operation of positioning the base frame and the arrangement associated with the vehicle reference points to be measured Suitable two pairs of vehicle reference points 9a (i.e., four points) precisely lying in a laterally symmetric relationship are selected from the vehicle 10, then a single vehicle reference point 9b to be determined of a position deviation is selected from the vehicle 10, the normal dimensional relationship of these vehicle reference points 9a and 9b not only in longitudinal but also in transverse directions is determined in reference with the plan view showing the vehicle dimensional schema, then four suspenders 6 and a single reference portion 12 are positioned on the base frame 4 according to the arrangement defined by said normal dimensional relationship. The normal vertical dimensions of these vehicle reference points 9a and 9b with respect the vehicle reference plane are respectively determined from the side view showing the vehicle dimensional schema, lengths of four suspenders 6 are adjusted to the vertical dimensions of said normally positioned four vehicle reference points 9a, respectively, and a length of the single pendulum member 17 is adjusted to the vertical dimension of said single vehicle reference point 9b to be measured. Then, the connectors 8 of the four respective suspenders 6 and the reference point corresponding portion 14 of said single pendulum member 17 are connected to the corresponding reference points 9a and 9b so as to suspend the base frame 4 and the single pendulum member 17 from the vehicle 10.

Even if the perpendicularity indicated by the pendulum member 17 deviates from the vertical direction of the vehicle 10 during this operation, the reference portion 12 is automatically displaced in response to said deviation and thereby automatically compensating an error due to a deviation of the perpendicularity indicated by the pendulum member 17 from the vertical direction of the vehicle 10, which is, in turn, caused by an inclination of the vehicle 10.

(2) Operation of detecting an error due to inclination of the vehicle

As previously mentioned, a deviation of the pendulum member 17 due to inclination of the vehicle 10 is automatically compensated by displacement of the reference portion 12 and, therefore, the operation of detecting an error due to inclination of the vehicle is unnecessary.

(3) Operation of compensating an error due to inclination of the vehicle

For the reason as previously mentioned, it is also unnecessary to perform the operation of compensating an error due to inclination of the vehicle.

(4) Operation of measurement

The operartion of measurement can be started immediately after completion of the operation as set forth in the paragraph (1). And the manner of this operation is identical to the operation of measurement as set forth in the paragraph (4) with respect to the well known vehicle measuring instrument.

In addition to the embodiment as has been described hereinabove, variants comprising the pendulum member, the reference portions and other components constructed as will be described are also covered by the present invention.

Figure 7:
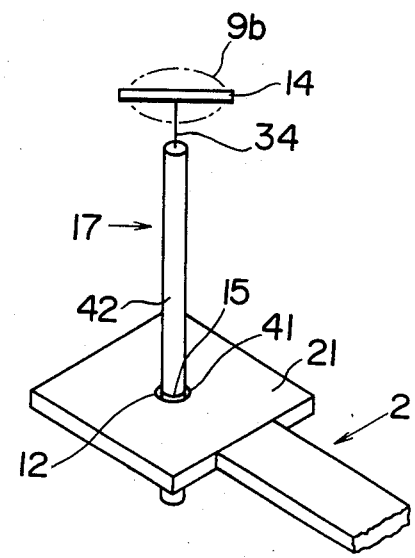
FIG. 7 is a perspective view showing an embodiment of pendulum member and the associated reference portion.

Variant 1 (See FIG. 7.)

Each plate 21 of the front-most extensible and contractible transverse frame 2 is centrally provided with an opening 41 vertically extending through this plate 21 to provide the reference portion 12. The pendulum member 17 comprises a vertically extending cylinder 42 of a diameter slightly smaller than that of the opening 41 and having at its upper end the reference point corresponding portion 14 adapted to be connected to the vehicle refernce point 9b. Said cylinder 42 is provided around its peripheral surface with a line serving as the opposing portion 15. The reference point corresponding portion 14 and said cylinder 42 are interconnected by the flexible slender rope 34 and this pendulum member 17 perpendicularly hangs down under an effect of its own gravity from the vehicle reference point 9b to indicate a perpendicularity.

It is different from the previous embodiment in that a position-deviation of the opposing portion 15 with respect to the reference portion 12 is determined by determination of the portion along the inner peripheral surface of the opening 41 formed in the reference portion 12 with which said cylinder 42 is in contact.

Figure 8:
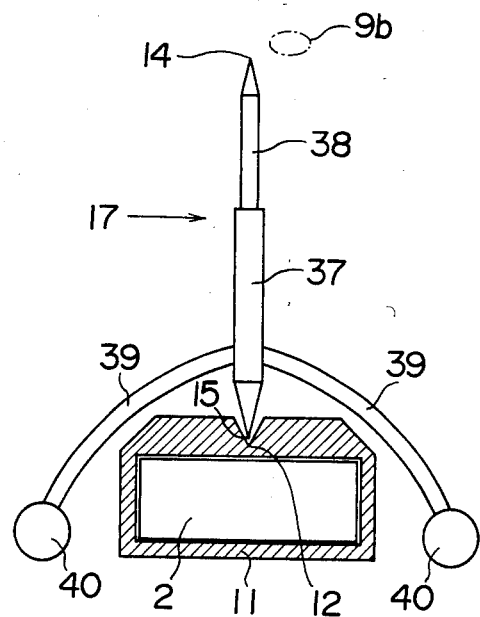
FIG. 8 is a side view showing another embodiment of a pendulum member and the associated reference portion partially in section.
Figure 10:
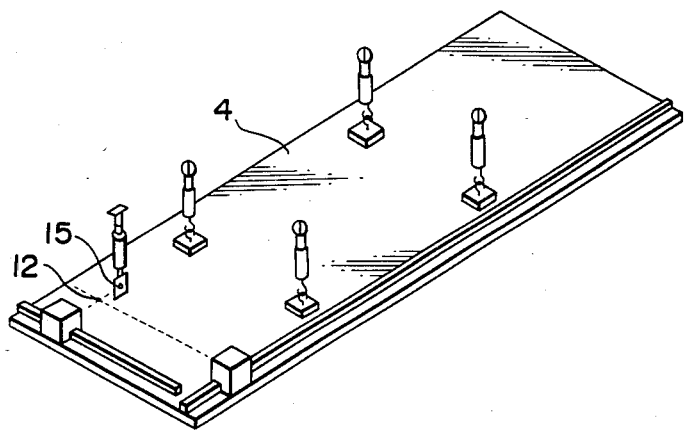
FIG. 10 is a perspective view of an embodiment of the present invention showing the rectangular plate and laser rays.
Figure 11:
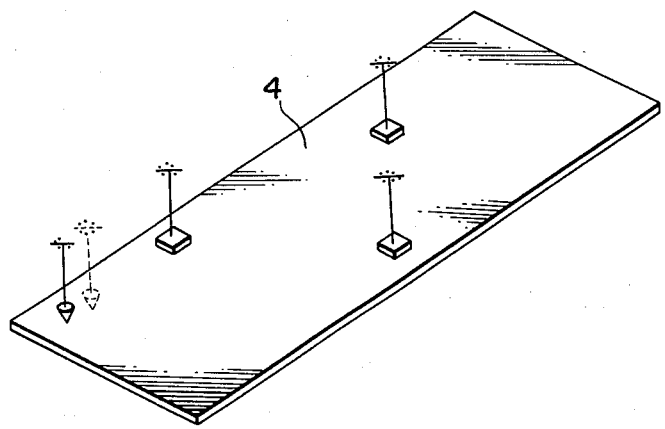
Figure 12:
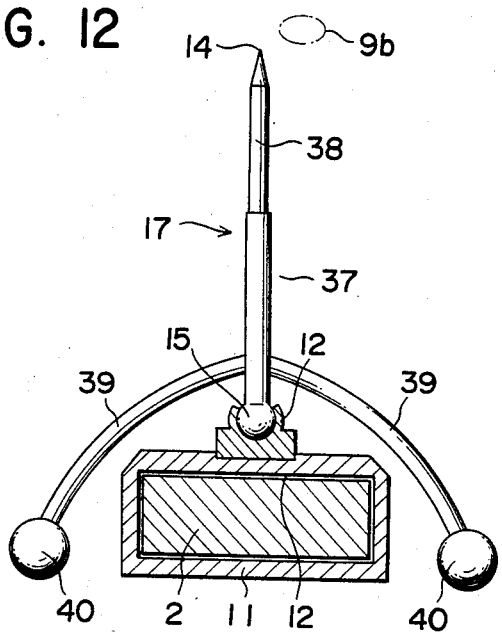
FIG. 12 is a cross-sectional side view of a pendulum member utilizing a universal joint.
Figure 13:
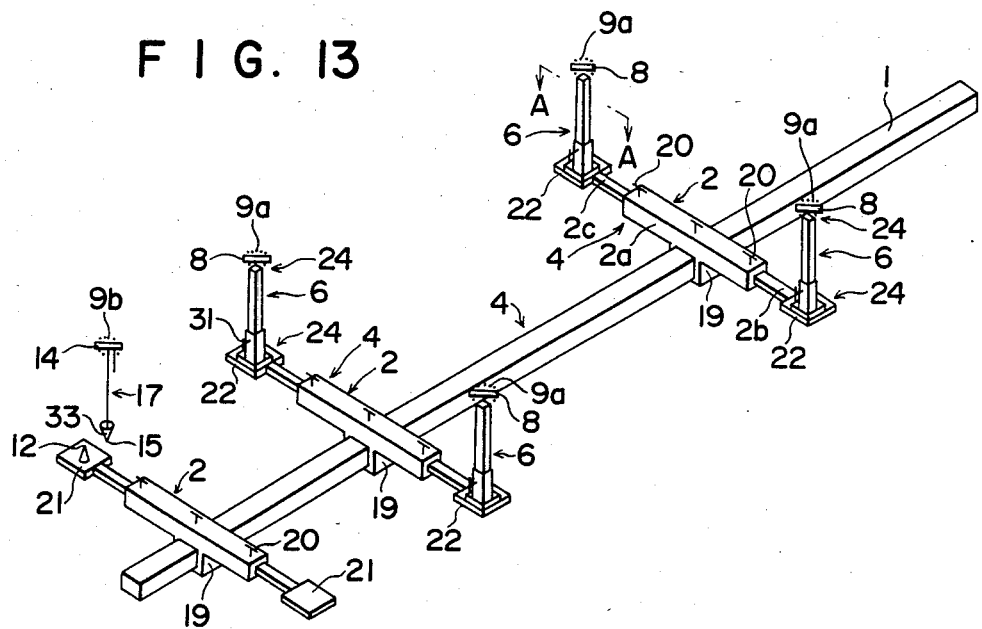
FIG. 13 is a perspective view of the embodiment shown in FIG. 2 showing the tip of an upwardly directed pin.

Variant 2 (See FIG. 8.)

In this variant, the slider 11 slidable along each transverse frame 2 consisting of a square pipe is provided centrally in its upper surface with a downwardly pointed conical recess serving as the reference portion 12. On the other hand, the pendulum member 17 comprises a pipe assembly having at its upper end a pointed reference point corresponding portion 14 destined to indicate the vehicle reference point 9b and having at its lower end a pointed opposing portion 15 destined to be opposed to the reference portion 12. More specifically, this pipe assembly comprises a large-diameter pipe 37 having an inner thread and a small-diameter pipe 38 having an outer thread so that the small-diameter pipe 38 may be rotated within the large-diameter pipe 37 to adjust a length of the pendulum member 17 in extendible and contractible manner. The outer peripheral surface of the small-diameter pipe 38 is partially flattened and this flat surface is provided with graduations or a measuring scale (not shown). The large-diameter pipe 37 is provided on front and rear sides of its outer periphery with downwardly curved arms 39 carrying on their lower ends respective weights 40.

This variant differs from the previously described embodiments of the present invention in that the pendulum member 17 is, instead of being suspended from the vehicle reference point 9b, placed on the associated transverse frame 2 with the opposing portion 15 resting on the reference portion 12 of the slider 11 so that the perpendicularity is indicated under the gravity acting on the front and rear plumb bobs 40 and in that the measurement is not based on the position-deviation of the opposing portion 15 with respect to the reference portion 12 but based on the position-deviation of the reference point corresponding portion 14 with respect to the given vehicle reference point 9b.

It is also possible to realize the reference portion and the opposing portion by a universal joint so that a turning point of said universal joint on the side of the base frame serves as the reference portion while a turning point of said universal joint on the side of the pendulum member serves as the opposing portion (not shown).

The pendulum member may take a shape curved like a crank so far as the perpendicularity can be indicate thereby. Namely, the pendulum member may be realized in any other manners so far as this can indicate the perpendicularity under an effect of the gravity.

In the embodiments of the present invention as have been described hereinabove, the base may be a rectangular plate. In such a case, the suspenders may be connected to such base frame by means such as sucking discs or magnets. The base frame is not restricted to a particular shape so far as this extends not only in longitudinal but also in transverse directions.

The connector also may be realized in various manners, for example, in the form of a hook-like hanger, a flange-like catcher or a pair of discs adapted to hole an object therebetween, provided that such connector is connectable to the vehicle reference point.

The suspender also may be realized in various forms such as pipe-like, bar-like, chain-like, chord-like, rope-like or belt-like means, provided that such suspender can suspend the base frame. Even a crank-like curved member may be adopted as such suspender when this extends at least in vertical direction.

The suspenders may be connected at three or more points out of alignment on a straight line to the base frame to achieve normal suspension of the base frame from the vehicle and, therefore, the desired function can be obtained by use of three or more such suspenders. However, the base frame may become unbalanced depending on a manner in which these suspenders are placed and, in such case, the base may be provided at a suitable location with a weight.

The reference portion and the associated opposing portion are the portions to be mutually opposed to each other while the reference point corresponding portion is the portion to be positioned in coincidence with the associated vehicle reference point.

Figure 9:
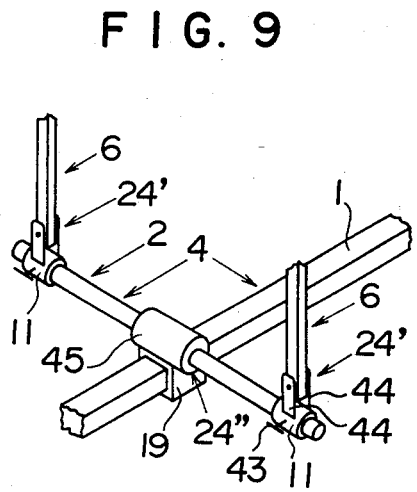
FIG. 9 is a perspective view showing an embodiment of an angle variable portion.

The angle variable portion adapted in the previously mentioned embodiment of the present invention may be realized also in such manners as following:

As shown by FIG. 9, the transverse frame 2 is formed by a length of round pipe around which there are provided two annular sliders 11 adjacent opposite ends, respectively, so that these sliders 11 are slidable along the transverse frame 2 and prevented from sliding by the threaded handles 43 threaded through walls of the respective sliders 11. A pair of flanges 44 parallel to each other in a diametric direction are erected on each slider 11 so as to extend upwardly, said flanges being centrally provided with through-holes in alignment with each other, and the lower end of the suspender 6 formed by square pipe is pivotally supported on a suitable pin extending through said through-holes between these parallel flanges 44 so that the suspender 6 may laterally swing around said pin under the effect of a weight of the base frame 4 in response to an inclination of the vehicle. Thus, a modified embodiment of the angle variable portion 24' is obtained, which permits the angle of each suspender 6 with respect to the base frame 4 to be laterally changed under said effect in response to the inclination of the vehicle. As another variation, the transverse frame 2 is inserted and supported in bearings (not shown) arranged in opposite ends of a short length of cylindrical pipe 45 which is secured to the slider 19 adapted to be slidable along the longitudinal frame 1 so as to an angle variable portion 24" substantially at a level of the connection between the suspender 6 and the base frame 4, which permits the angle of each suspender 6 with respect to the base frame 4 to be longitudinally changed under the effect of a weight of the base frame 4 in response to the inclination of the vehicle.

Furthermore, it is also possible to realize each suspender in the form of a length of flexible chord, chain, rope or belt so that the portions of the suspender defined by a location lying immediately above the connection to the base frame and by a location lying immediately below the connection to the connector, respectively, serve as angle variable portions permitting the angle of each suspender with respect to the base frame to be changed longitudinally, transversely and in a composite direction under the weight of the base frame itself in response to the inclination of the vehicle (not shown).

Any one of the above disclosed embodiments of the angle variable portion may be incorporated in said well known vehicle measuring instrument of this type as shown by FIG. 1 on both the upper portion and the lower portion of each suspender 6.

Thus, the angle variable portion may be of any arrangement, provided that the angle of each suspender with respect to the base frame can vary, under the weight of the base frame itself, longitudinally, transversely and in a composite direction in response to the inclination of the vehicle. As in the previously mentioned variation, the angle variable portions are preferably provided substantially at the level of the connection between the respective suspenders and the base frame as well as substantially at the level of the respective connectors.

Although the well known vehicle measuring instrument of this type and the embodiments of the present invention have been described, for simplification, in reference with the case in which a single vehicle reference point should be measured, two or more vehicle reference points may be measured by correspondingly increasing the number of the necessary components such as the pendulum members, the reference portions and the transverse frames.

These components such as the base frame, the suspenders and the pendulum members may be provided with measuring scales or graduations, or a commercially available measuring tape or like may be used to achieve the desired operation without said measuring scales or graduations. The reference portions, the opposing portions or the reference point corresponding portions may be replaced by any memorized graduations on said measuring tape.

The slider means in the above-mentioned embodiments of the present invention may be realized in various forms such as rollers, provided that a desired displacement can be obtained thereby.

The expression "connector adapted to be connected to the vehicle reference point" used in the present specification and the claims includes a connector adapted to be connected to the vehicle itself in accordance with the vehicle reference points. For example, an inverted tripod sized in order of the hand palm is centrally provided with an upwardly extending needle and provided on upper ends of the respective legs with magnets so that said upper ends of the respective legs and the upper end of the needle may be flush. The connector thus constructed will be not directly connected to the vehicle reference point but connected to the vehicle by said magnets of the respective legs attractively secured to steel plate around the vehicle reference point toward which the upper end of the needle points.

Some of the car mechanics treat the cars of particular types and, in such case, the suspenders, the transverse frames, the reference portions, the pendulum members and other components may be manufactured in accordance with the placements and the lengths peculiar to these particular types and used without any more adjustments. In this event, neither the arrangement by which the suspenders, the reference portions and the other components may be longitudinally or transversely displaced on the base frame nor the arrangement by which the lengths of the suspenders and the pendulum members may be adjusted is necessary.

All the embodiments of the present invention as have been described hereinbefore provide the effect of the present invention and this invention is never limited to any particular embodiment. Furthermore, the present invention is not limited even to the embodiments as have been above-mentioned and may be modified or varied, if necessary, without departure from the scope of the present invention.

What is claimed is:

1. A vehicle measuring instrument including a base frame at least longitudinally and transversely extending, three or more suspenders having connectors adapted to be connected to a vehicle at vehicle reference points, said suspenders at least vertically extending and connected to the base frame at three or more positions not lying in a straight line and thereby suspending the base frame from the vehicle, reference portions provided on said base frame, pendulum members serving to indicate a perpendicularity under an effect of its own gravity, and said pendulum members having reference point corresponding portions to be positioned in conformity with the respective vehicle reference points and opposing portions to be opposed to said reference portions so that the possible deviations of the vehicle reference points from the respective normal positions may be indicated with the above-mentioned arrangement, characterized in that there are provided angle variable portions permitting angles of the respective suspenders with respect to the base frame to vary in longitudinal direction, transverse direction and composite directions of them under an effect of the base frames own weight depending on an inclination of the vehicle.

2. A vehicle measuring instrument according to claim 1, wherein the angle variable portions are provided substantially at the level of the connectors and below them.

3. A vehicle measuring instrument according to claim 2, wherein the angle variable portion is provided at a location of connection between the suspender and the base frame.

4. A vehicle measuring instrument according to claim 2, wherein the angle variable portion is provided on each of the connectors.

5. A vehicle measuring instrument according to claim 1, wherein the base frame comprises longitudinally extending longitudinal frames and transversely extending transverse frames.

6. A vehicle measuring instrument according to claim 1, wherein the pendulum member perpendicularly hangs down under an effect of its own gravity from the vehicle reference point to indicate a perpendicularity.

7. A vehicle measuring instrument according to claim 1, wherein the reference point corresponding portion comprises a connector adapted to be connected to the vehicle reference point.

8. A vehicle measuring instrument according to claim 1, wherein the reference portion is defined by a tip of an upwardly directed pin.

9. A vehicle measuring instrument according to claim 1, wherein the opposing portion is defined by a lower end of a plumb bob.

10. A vehicle measuring instrument according to claim 1, wherein the angle variable portion is defined by a universal joint.

11. A vehicle measuring instrument according to claim 1 wherein the base frame comprises a rectangular plate.

12. A vehicle measuring instrument according to claim 1 wherein the pendulum member perpendicularly extends upwards under an effect of its own gravity to indicate a perpendicularity.

13. A vehicle measuring instrument according to claim 1 wherein the reference point corresponding portion comprises a tip of a pin adapted to point to the vehicle reference point.

14. A vehicle measuring instrument according to claim 1 wherein the reference portion is defined by an upwardly directed spot-like marking.

15. A vehicle measuring instrument according to claim 1 wherein the reference portion is defined by a laser ray.

16. A vehicle measuring instrument according to claim 1 wherein the reference portion is defined by a bending point of a universal joint on the side of the base frame.

17. A vehicle measuring instrument according to claim 1 wherein the reference portion is defined by a downwardly directed conical recess.

18. A vehicle measuring instrument according to claim 1 wherein the opposing portion is defined by a point on a transparent plate.

19. A vehicle measuring instrument according to claim 1 wherein the opposing portion is defined by a bending point of a universal joint on the side of the pendulum member.

20. A vehicle measuring instrument according to claim 1 wherein the opposing portion is defined by a tip of a downwardly directed pin.

21. A vehicle measuring instrument according to claim 1 wherein the angle variable portion is defined by a chord-like means.

22. A vehicle measuring instrument according to claim 1 wherein the angle variable portion is defined by a rope-like means.

23. A vehicle measuring instrument according to claim 1 wherein the angle variable portion is defined by a belt-like means.

24. A vehicle measuring instrument according to claim 1 wherein the angle variable portion is defined by a pair of hook means adapted to be engaged with each other.

* * * * *